Nov. 9, 1943.  C. O. NESS  2,333,669
MEAT GRINDER
Filed March 3, 1941   2 Sheets-Sheet 1

INVENTOR.
CURTIS O. NESS
BY Rollander, McGrew & Campbell
Attorneys.

Nov. 9, 1943.  C. O. NESS  2,333,669

MEAT GRINDER

Filed March 3, 1941  2 Sheets-Sheet 2

INVENTOR.
CURTIS O. NESS
BY
Rollandet, McGrew & Campbell
Attorneys.

Patented Nov. 9, 1943

2,333,669

UNITED STATES PATENT OFFICE 2,333,669

MEAT GRINDER

Curtis O. Ness, Denver, Colo.

Application March 3, 1941, Serial No. 381,433

8 Claims. (Cl. 146—182)

This invention relates to an improved meat chopper or grinder.

Ordinarily, ground meat, "hamburger" or the like is prepared and dispensed in small quantities as purchased by the consumer. The devices used for this purpose are commonly open, unrefrigerated grinders which readily can be contaminated by dust, dirt, insects and the like. Furthermore, meat particles adhering to and within ordinary grinders between uses are subject to rapid spoilage, particularly in warm weather because they are not cooled or otherwise refrigerated. The result of this is logically a tendency to produce an inferior and, in some instances, a definitely unsanitary product. Furthermore, according to ordinary practice, each batch of meat to be ground for a customer must be individually weighed before grinding as otherwise there is no way of determining the amount of meat being ground.

Therefore, a general object of the invention is to provide a meat chopper or grinder that will produce a superior finished product under extremely sanitary conditions.

More specifically, an object of the invention is to provide a refrigerated meat chopper or grinder.

A further object is to provide such a machine that is well enclosed to prevent to a large extent, the entrance of foreign matter such as atmospheric dust, insects and the like.

Still another object is to provide a self-feeding magazine type of meat chopper which can be loaded with a quantity of meat which will be preserved under sanitary conditions and dispensed through the grinding portion of the machine at intervals as required.

Still another object is to provide a meat chopper or grinder that will automatically dispense a predetermined amount of the finished product.

Other objects and advantages will reside in details of design and construction which will be more fully disclosed in the following description and in the drawings wherein like parts have been similarly designated and in which.

In order to illustrate operative reductions to practice of the present inventive concept, the accompanying drawings will be described in some particularity. However, this disclosure merely presents typical examples and should not be construed to set forth any limitations to the invention, the scope of which is well measured in the appended claims.

Figure 1:
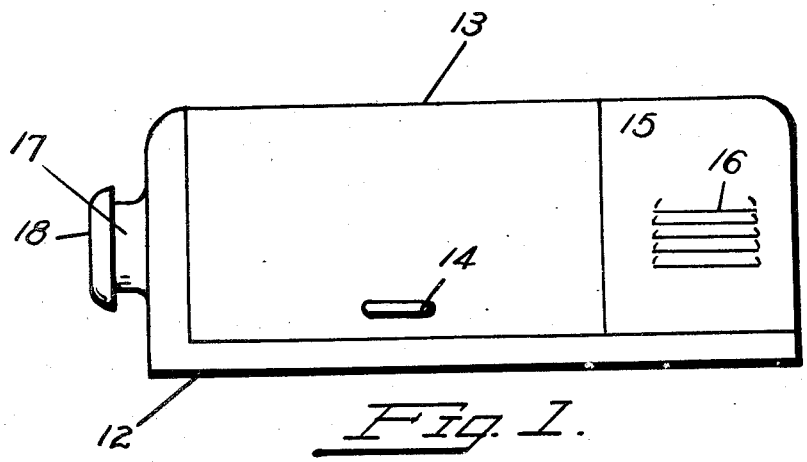
Figure 1 is a side elevation of a machine that embodies the present inventive concept.

Beginning with Figure 1, reference character 12 denotes a base structure upon which is mounted a removable hood 13 having one or more handles 14. Another hood 15 is mounted adjacent the hood 13 upon the base structure 12 and is provided with a series of ventilating louvers 16. A discharge neck for the finished product projects longitudinally as shown at 17, and is covered when not in use by a cap 18.

Figure 2:
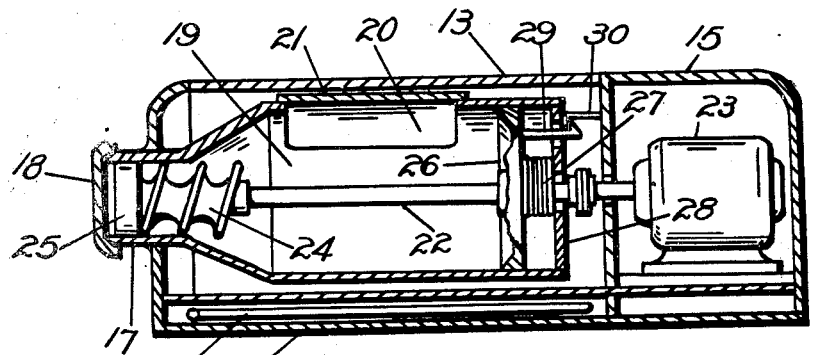
Figure 2 is a central longitudinal section of the machine illustrated in Figure 1.

As illustrated in Figure 2, within the hood 13 is mounted a storage magazine 19 that is of general cylindrical shape tapering to connect with the discharge 17. The magazine 19 is provided with a loading and servicing opening 20 that is closed with a hinged cover 21.

A shaft 22 extends longitudinally through the magazine 19 and is connected for rotation with a reduction geared motor 23 that is positioned within the hood 15 and carried upon the general base structure 12.

A meat feeding screw or worm 24 is carried upon the shaft 22 and positioned in the discharge neck 17, to cooperate with the grinding head 25.

A disk 26 is slidably positioned upon the shaft 22 and fits rather closely within the cylindrical magazine 19. This disk 26 is urged longitudinally along the shaft 22 toward the discharge 17, by means of a compression spring 27 that abuts thereagainst. The other end of the spring 27 bears against the fixed head 28 of the cylindrical magazine 19, through which the shaft 22 extends to connect with the shaft of the motor 23.

A resilient catch 29 is carried upon the slidable disk or head 26 in a position to extend through a suitable opening provided in the stationary head 28 and to engage a stationary companion latch member 30, when the movable disk or head 26 is retracted to the left as illustrated in Figure 2. The engagement of the latch members 29 and 30 will hold the slidable disk or head 26 against the urge of the compression spring 27, while the cylindrical magazine 19 is being cleaned, serviced and filled with meat, after which the latch engagement is released so that said slidable disk or head 26 will be urged by the spring 27 toward the screw or worm 24 to feed automatically the meat toward the cutting or grinding end of the machine.

Carried in a suitable recess in the base structure 12 is a series of refrigerating coils 31 which are to be connected with any conventional refrigerating unit not shown, and which are in heat-absorbing proximity to the meat magazine 19.

Figure 3:
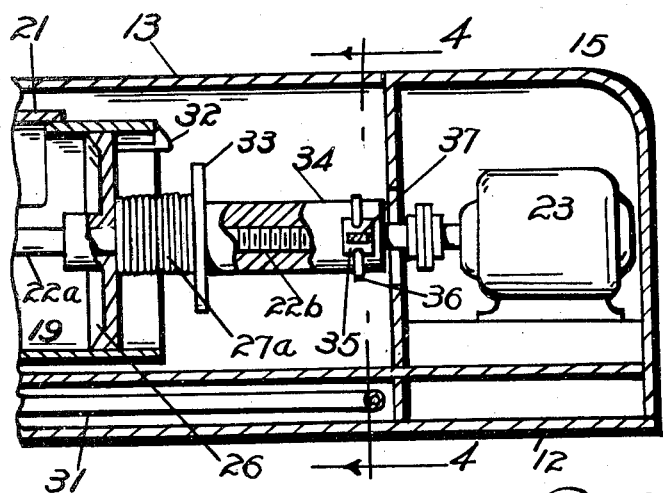
Figure 3 is a fragmentary longitudinal section of a machine similar to that shown in Figures 1 and 2, but drawn on a somewhat larger scale and embodying certain modifications.
Figure 4:
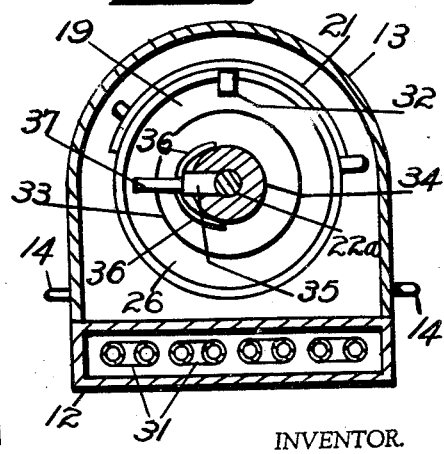
Figure 4 is a sectional view taken along the line 4—4 of Figure 3.

Next referring to Figures 3 and 4, a modification of the automatic meat-feeding mechanism is illustrated, wherein a shaft 22a corresponds to shaft 22 and is threaded along a portion of its length as shown at 22b. The end of the cylindrical magazine 19 that is opposite the feed discharge, is open so that a resilient latch or catch 32 carried upon the slidable disk or head 26 may engage the rear edge of said cylindrical magazine 19.

The movable disk or head 26 is urged toward the discharge end of the machine by means of a compression coil spring 27a, which also is urged in the same direction at the will of the operator, by means of a disk 33 having an elongated hub 34 positioned around the threaded portion 22b of the shaft 22a. This hub 34 is not in threaded engagement with the threads 22b of the shaft, but a radially movable plug 35 is in such threaded engagement and is urged toward the shaft by means of springs 36.

A handle 37 is attached to the plug 35 so that an operator may pull said plug 35 out of threaded engagement with the threads 22b of the shaft 22a, whereupon the entire assembly 26—27a—33—34 may be manually moved longitudinally along the shaft 22a. By this provision, the disk 26 can be retracted or moved back away from the discharge end so that the operator may clean, service and refill the cylindrical magazine 19.

It is manifest that the shaft 22a is in driven connection with the reduction geared motor 23 and that when the threaded plug 35 is in engagement with the threads 22b, the hub 34 and the disk 33 pressing against the compression spring 27a, will be driven to the right as illustrated in Figure 3, or, in other words, toward the discharge end of the machine to feed meat automatically to the grinder.

It is manifest without illustration that the handle 37 could extend out through a slot-like opening in the hood 13 if desired, in order to be accessible to the operator without lifting said hood 13.

Refrigeration coils 31 are, of course, included in the base structure 12 of the form of the device illustrated in Figures 3 and 4, thus to be in heat-absorbing proximity to the cylindrical magazine 19, as they are also positioned in the forms illustrated in Figures 1 and 2.

Figure 5:
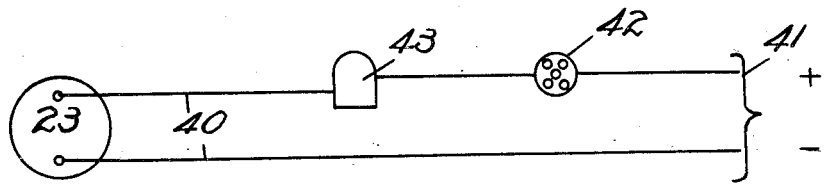
Figure 5 is an electrical wiring diagram of a hookup that is well adapted to be used in connection with the machines illustrated in Figures 1, 2, 3 and 4.

Figure 5 illustrates a simplified wiring diagram wherein a two-wire circuit 40 is connected with a source of power 41 and the motor 23. Included in the circuit 40 is a manually operable snap-switch 42, and a time switch 43 whereby the motor 23 may be set to operate for a predetermined period of time, thus to dispense a predetermined amount of the finished product. It is manifest that the location of the switches 42 and 43 may be on the machine, adjacent the machine, or in any other convenient place.

Figure 6:
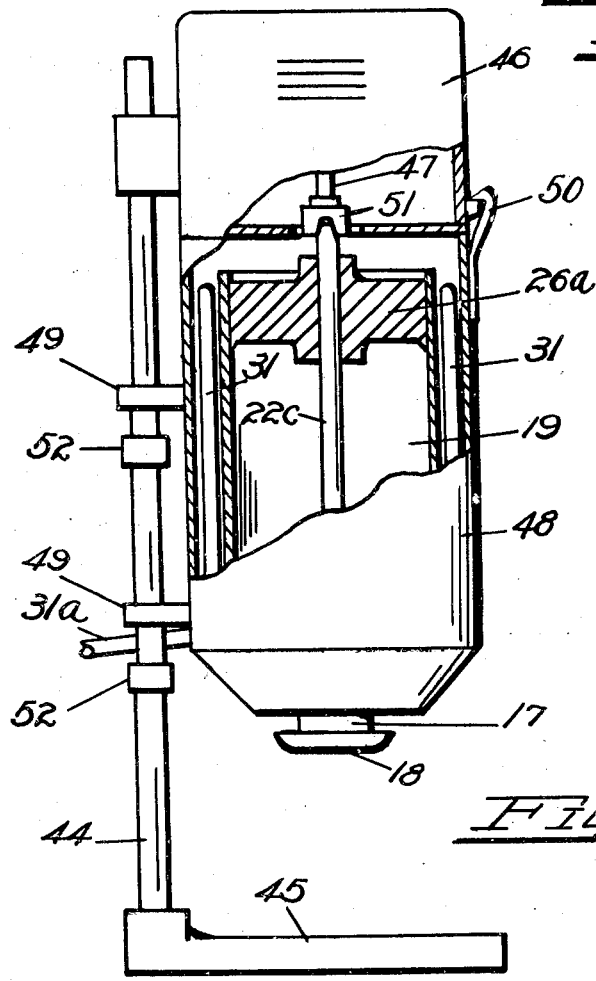
Figure 6 is an elevation partially in section of a machine that embodies a modification of the present invention.

Figure 6 illustrates an upright or vertical arrangement of a machine similar to the ones hereinbefore described, wherein a vertical standard 44 is carried upon a base 45. A relatively stationary housing 46 is carried upon the standard 44 within which is mounted the motor 23 having a downwardly extending shaft 47.

Also carried upon the upright standard 44 is a housing 48 which is rotatable thereon by means of standard engaging lugs 49.

The housing 48 is also slidable up and down along the standard 44 and is held up in its operating position by means of one or more latch elements 50 which engage the stationary housing 46 to hold the shaft 22c that is entirely comparable to the shaft 22 of Figure 2, in engagement with the jaw clutch 51 on the motor shaft 47. In this position, driving power is transmitted from the motor shaft 47 to the shaft 22c, which, of course, carries the meat-feeding screw or worm 24.

For servicing, cleaning and reloading the cylindrical magazine 19 which in Figure 6, is positioned upright, it is only necessary to release the latch or latches 50 and then to slide the relatively movable housing 48 downwardly on standard 44 until lugs 49 bear upon relatively stationary collars 52, whereupon it may be rotated away from the stationary housing 46 so that a gravity-actuated automatic meat feeding or pressing disk or head 26a may be manually lifted upwardly off shaft 22c, whereupon the interior of the cylindrical magazine 19 is accessible.

Within the housing 48 adjacent the cylindrical magazine 19, in heat-absorbing relationship thereto, are positioned the cooling or refrigerating coils 31 which in this form, are provided with a flexible connection 31a to any conventional refrigeration unit not shown.

It is manifest that in the form illustrated in Figure 6, preloaded magazines 19 may be interchangeably inserted in the housing 48 if and as desired.

In the upright form shown in Figure 6, the slidable disk or head 26a which urges the meat in the magazine 19 toward the meat-feeding screw or worm, may be designed to have relatively more mass than the corresponding element 26 of Figures 2 and 3. This mass gives the component 26a sufficient weight to force the meat toward the cutter. The components 24 and 25 together are considered the active portion of the cutting mechanism.

Figure 7:
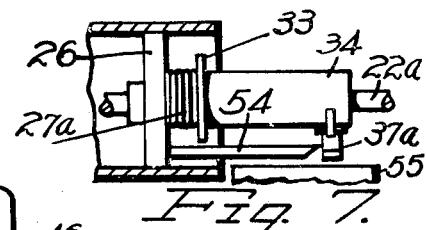
Figure 7 is a fragmentary sectional view illustrating modified features of the present invention that are well adapted to be incorporated in the form illustrated in Figures 3 and 4.

The components illustrated in Figure 7 are similar to those shown in Figure 3. In addition, automatic means for engaging and disengaging the threaded lug 35 are shown. These automatic means comprise a resilient bar 54 extending rearwardly from and carried upon slidable disk 26, and having at its rearmost end a beveled portion which is positioned and adapted to engage in a hook-like member 37a which is attached to the spring-urged threaded plug 35.

When the resistance to the forward movement of the meat-urging disk 26 is such that the spring 27a is compressed to a predetermined degree by the forward advance of the disk 33, then the beveled end of the bar 54 acts upon the hook-like member 37a to pull the threaded plug 35 radially out of engagement with the threads on the shaft 22a, and at the same time cause said member 37a to bear against a break block 55 which may be conveniently mounted upon the base structure 12. This will stop the forward progress of the disk 33 and hold it until the spring 27a again expands to move the disk 26 to a position where the threaded plug 35 will again engage the threads on the shaft 22a. By this arrangement, a more or less uniform pressure is exerted against the meat in the magazine 19 and the danger of overforcing the disk 26 is eliminated.

Operation

Briefly stated, the operation of all forms of the present machines is as follows: Meat is loaded into the cylindrical magazine wherein is provided means for automatically urging the meat so stored toward the cutting or chopping end of the device. Meat so stored in the magazines is scientifically refrigerated so that no deterioration or spoilage will occur within any reasonable amount of time. The entire machine is carefully enclosed and even the discharge 17 is sealed by means of cap 18 when not in actual use, thus preventing the entrance of dust, dirt, insects and the like which would tend to contaminate the meat.

The time switch 43 may be set so that the device will operate when actuated by the hand switch, to grind and discharge a predetermined amount of the finished product, thus saving time on the part of the operator.

The time switch 43 may be used in connection with any of the machines herein disclosed if desired, or it may be omitted if preferred.

Thus is provided a storage type refrigerated meat chopper or grinder that will produce an unusually sanitary and superior product, and which will save time and work for the owner and provide a more desirable product from the consumer's viewpoint.

While the present device has been disclosed as primarily a meat grinder or chopper, it will be understood that it may advantageously be used for other perishable food products or the like.

What I claim and desire to secure by Letters Patent is:

1. A meat grinder comprising a meat-holding magazine for retaining unground meat, a meat cutting mechanism including a worm cooperating with the discharge end of the magazine to effect grinding action, a shaft extending through the magazine from end to end upon which the cutting mechanism and worm are mounted, a pusher element normally located at the end of the magazine opposite said discharge end surrounding said shaft and movable therealong to feed the meat to the worm, an inlet between the worm and the pusher element for charging the magazine with meat, means for normally urging the pusher toward said worm to maintain the meat to be ground in compacted condition, and means for rotating said shaft and cutting mechanism.

2. A meat grinder comprising a meat-holding magazine for retaining unground meat, a meat cutting mechanism including a worm cooperating with the discharge end of the magazine to effect a grinding action, a shaft extending through the magazine from end to end upon which the cutting mechanism and worm are mounted, a pusher element normally located on the shaft at the end of the magazine opposite said discharge end and movable along the shaft to feed the meat to the worm, pusher-actuating mechanism in driven connection with said shaft, and means for rotating said shaft and cutting mechanism.

3. A meat grinder comprising a meat-holding magazine for retaining unground meat, a meat cutting mechanism including a worm cooperating with the discharge end of the magazine to effect a grinding action, a shaft extending through the magazine from end to end upon which the cutting mechanism and worm are mounted, a pusher element normally located on the shaft at the end of the magazine opposite said discharge end and movable along the shaft to feed the meat to the worm, pusher-actuating mechanism in driven connection with said shaft, and means including an electric motor, a time switch and a circuit inclusive of said motor and said switch for rotating said shaft and cutting mechanism through repetitions of an operating cycle of uniform duration.

4. A meat grinder comprising a meat-holding magazine for retaining unground meat, a meat cutting mechanism including a worm cooperating with the discharge end of the magazine to effect a grinding action, a shaft extending through the magazine from end to end upon which the cutting mechanism and worm are mounted, a pusher element normally located on the shaft at the end of the magazine opposite said discharge end and movable along the shaft to feed the meat to the worm, pusher-actuating mechanism in driven connection with said shaft, means for rotating said shaft and cutting mechanism, and means for stopping pusher movement induced by said rotation of the shaft whenever a predetermined resistance to the pusher movement develops.

5. A meat grinder comprising a housing divided into a plurality of compartments, a meat-holding magazine in one compartment having a discharge spout extending beyond the housing, meat-cutting mechanism including a worm cooperating with said discharge spout to effect a grinding action, a prime mover in another compartment in the housing, a shaft extending from the prime mover and through the magazine from end to end upon which the cutting mechanism and worm are mounted, an element mounted on the shaft in hermetically-sealing relation to the end of the magazine opposite its discharge spout and movable along the shaft to feed the meat to the worm, means normally urging said sealing-element toward said worm to maintain the meat to be ground in compacted condition, refrigerating means in the housing for maintaining the magazine and its contents at a predetermined temperature, and means normally closing the spout against the admission of air.

6. A meat grinder comprising a housing divided into a plurality of compartments, a meat-holding magazine in one compartment having a discharge spout extending beyond the housing, meat-cutting mechanism including a worm cooperating with said discharge spout to effect a grinding action, a prime mover in another compartment in the housing, a shaft extending from the prime mover and through the magazine from end to end upon which the cutting mechanism and worm are mounted, an element mounted on the shaft in hermetically-sealing relation to the end of the magazine opposite its discharge spout and movable along the shaft to feed the meat to the worm, means normally urging said sealing-element toward said worm to maintain the meat to be ground in compacted condition, refrigerating means in a third compartment in the housing maintained in heat-transfer relation to the